June 12, 1962 C. J. ARNDT ETAL 3,038,588
MODIFIED FULL FLEXIBLE TROUGHING IDLER ASSEMBLY
FOR LOW CLEARANCE OPERATIONS
Filed Dec. 29, 1959 2 Sheets-Sheet 1
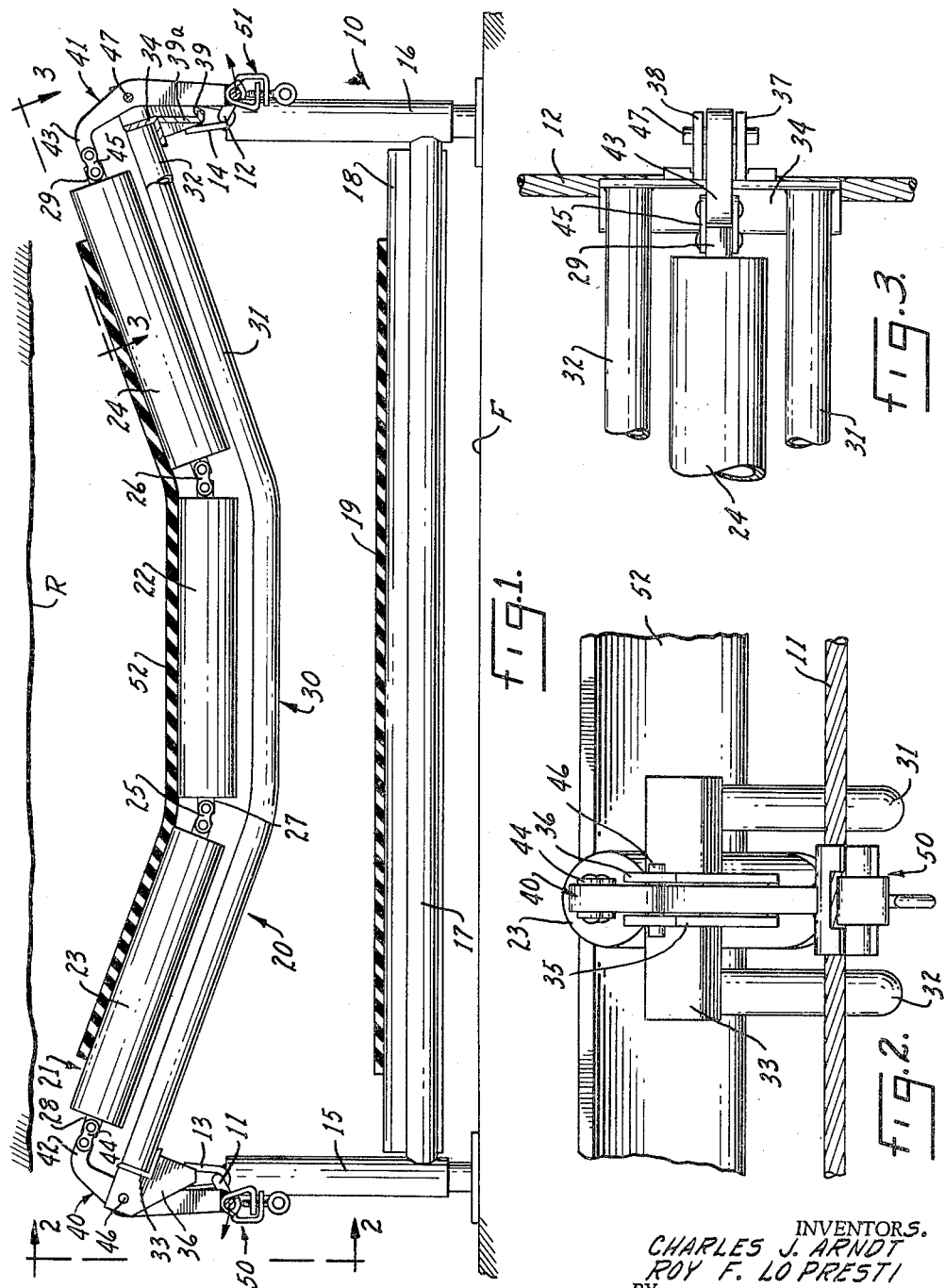
INVENTORS.
CHARLES J. ARNDT
ROY F. LO PRESTI
BY *Parker & Carter*
*Attorneys.*

3,038,588
MODIFIED FULL FLEXIBLE TROUGHING IDLER ASSEMBLY FOR LOW CLEARANCE OPERATIONS

Charles J. Arndt, Harvey, and Roy F. Lo Presti, Chicago, Ill., assignors to Goodman Manufacturing Company, Chicago, Ill., a corporation of Illinois
Filed Dec. 29, 1959, Ser. No. 862,562
3 Claims. (Cl. 198—192)

This invention relates generally to flexible belt conveyors and particularly to a troughing idler assembly for such conveyors which is especially adapted for use in low clearance operations.

Rope side frame conveyors of the type illustrated in the Craggs et al. Patent No. 2,773,257 have come into widespread use in recent years due to their many desirable features. Among these are high carrying capacity, low cost, ease of installation and maintenance, and ready adaptability to nearly any conveyor environment.

This type of conveyor generally comprises a pair of rope side frames such as wire ropes which are supported in generally parallel relationship at predetermined intervals along a conveying course such as a mine run by a plurality of support structures. The support structures may take the form of ground engaging support stands or hanger structures connected to an overhead support such as the mine roof. A plurality of troughing idler assemblies are hung from the rope side frames at intervals to form a bed which supports the conveying reach of an endless flexible conveyor belt. Return roller assemblies are located at intervals along the conveying course to support the return reach of the belt. These return roller assemblies may be suspended directly from the rope side frames or carried by other suitable supporting structures such as the rope side frame support stands. In general, since the return roller assemblies carry no load other than the weight of the return reach of the belt, they are positioned at substantially greater intervals along the conveying course than are the conveying troughing idler assemblies.

Several variations on the basic troughing idler assembly illustrated in the aforesaid Craggs et al. patent have been developed. For purposes of illustration, however, they will be lumped into two broad categories, namely, the fully flexible troughing idler assembly, exemplified by the Craggs et al. sausage roller structure, and the cradled troughing idler assembly, exemplified by the McCallum Patent No. 2,851,151.

The fully flexible troughing idler assembly is widely used in above ground operations and in underground operations in which there is relatively ample clearance, say, on the order of 4 feet or more. The structure consists essentially of a plurality of belt supporting rollers which are interconnected for flexing movement in a generally vertical plane. The rollers may be placed in general end-to-end alignment, or they may be offset with respect to one another along the length of the conveyor, but in any event they are free to flex through a substantial range of movement with respect to one another in a generally vertical plane. When a load on the conveyor belt passes over the assembly the assembly flexes downwardly and the outer ends of the flanking or wing rollers move inwardly towards one another to thereby form a trough which in effect curls around the load. This feature of deformation of the troughing contour in conformity with the load carried thereon substantially increases the carrying capacity over prior conveyors, and helps prevent conveyed material near the teetering point along the edges of the belt from toppling off.

Since the conveying reach of the fully flexible assembly runs directly over the return reach of the belt, it is sometimes impractical to utilize this type of conveyor in an underground operation having limited headroom because the downward sag or troughing movement of the assembly under load causes it to interfere with the return reach.

The cradled troughing idler assembly is widely used in underground operations, particularly those in which head room is relatively limited, say, on the order of 4 feet or less. This type of assembly as illustrated in the McCallum patent, consists essentially of a substantially rigid frame structure which supports a troughing roller assembly, the frame structure then being connected to the rope side frames of the conveyor. The carrying capacity of the cradled assembly is not quite so great as that of the fully flexible assembly since the angle of flexure of the troughing rollers is substantially fixed. The angle is usually substantially less than the maximum troughing angle which the rollers would assume under a heavy load if they were free to flex with respect to one another. Since the angle of flexure is limited, however, there will be relatively little inward movement of the flexible strands, and all of the load carried by the belt will be transmitted to the strands in a downward direction. As a result, for the same amount of carried load as compared with a fully flexible troughing idler assembly, there will be substantially less downward movement of the troughing idler assembly (more specifically, the middle or intermediate rollers) and consequently less chance of the assembly interfering with the return reach. There has long been, however, a need in the coal mining industry for an underground troughing idler assembly which combines the relatively large flexing movement and corresponding large carrying capacity characteristics of the fully flexible idler assembly with the relatively small downward displacement of the cradled idler assembly.

Accordingly, a primary object of this invention is to provide a cradled troughing idler assembly especially useful in low clearance operations in which the individual troughing rollers are as flexible as those in a fully flexible assembly to thereby provide a troughing idler assembly combining the advantageous features of both general types.

Another object is to provide a cradled troughing idler assembly in which the softness of the ride is varied with the load or, in other words, a troughing idler assembly in which the individual troughing rollers, though free to flex in a generally vertical plane with respect to one another, actually are displaced downwardly an amount roughly proportional to the load carried thereon.

A further object is to provide a cradled troughing idler assembly having a troughing roller assembly with a fully flexible movement in which downward and inward flexing movement of the roller assembly is limited by gradually stiffening limit means.

Yet a further object is to provide a cradled troughing idler assembly having a fully flexible roller assembly in which downward and inward flexing movement of the roller assembly is limited by positive stop means to thereby prevent dumping of the load when the conveyor is loaded above its maximum carrying capacity.

Yet another object is to provide a cradled troughing idler assembly having a fully flexible troughing roller assembly in which imposition of a load over the assembly causes an outward displacement of the flexible strands to which the assembly is connected to thereby at least partially counteract the sagging of the strands induced by load passing over the assembly.

Other objects and advantages of the invention will become apparent upon a reading of the following description.

The invention is illustrated more or less diagrammatically in the accompanying drawings, wherein:

FIGURE 1 is a section through a rope side frame conveyor illustrating the cradled troughing idler assembly of the present invention;

FIGURE 2 is an end view of the troughing idler assembly taken substantially along the line 2—2 of FIGURE 1;

FIGURE 3 is a top plan view with parts omitted for clarity of a portion of the cradled troughing idler assembly of FIGURE 1 taken substantially along the line 3—3 of FIGURE 1.

Like reference numerals will be used to refer to like parts throughout the following description of the drawings.

Figure 4:
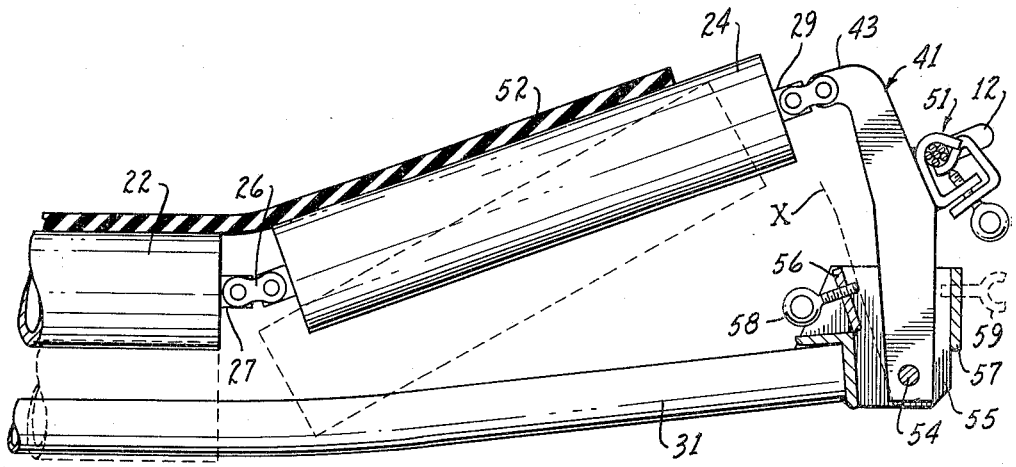
FIGURE 4 is a partial sectional view similar to FIGURE 1 of a modification of the invention.

In FIGURES 1, 2, and 3, a flexible belt conveyor is indicated generally at 10 resting on the floor F of a coal mine, for example. The roof is indicated at R, and from the proximity of the roof and floor it can be seen that the conveyor is installed in a relatively low clearance environment.

The conveyor consists basically of a pair of flexible strands or rope side frames 11 and 12 which may be wire ropes or the like, resting in U-shaped saddle members 13 and 14 welded or otherwise suitably secured to the top of telescoping vertically adjustable support stands 15 and 16. Since the details of the support stands are not essential to an understanding of the invention, they are not described in detail. The stands are maintained a fixed distance apart by a cross brace or strut 17. A return roller which may be supported from either the cross brace or the support stands or any other suitable support structure, including even the flexible strands, is indicated at 18, and supports the return reach 19 of a flexible conveyor belt.

A troughing idler assembly is indicated generally at 20 suspended from the rope side frames 10 and 11. The troughing idler assembly is not a completely, fully flexible idler assembly or a completely rigid cradled idler assembly, but combines features of each as will be apparent from the following description.

The troughing idler assembly consists essentially of a roller assembly 21 comprising a center primary load carrying roller 22 and a pair of flanking or wing rollers 23 and 24. The rollers are interconnected by any suitable structure, which in this instance has been illustrated as pairs of chain links 25 and 26. The chain links are vertically oriented so that the rollers may flex with respect to one another in a generally vertical plane. Although chain links have been illustrated, and the rollers have been shown in an end-to-end relationship, it should be understood that any suitable connecting structure which permits generally vertical flexing movement of the rollers with respect to one another may be utilized, and similarly, the rollers need not be aligned in end-to-end relationship. They could for example be offset with respect to one another along the length of the conveyor.

The rollers consist essentially of a tubular shell which rotates about a dead shaft, suitable bearings being interposed between the shaft and shell. The shaft of the center or intermediate roller is indicated at 27 and the wing roller shafts are indicated at 28 and 29. As clearly illustrated in FIGURE 1, the chain links 25 and 26 are pivotally connected to the ends of adjacent shafts.

A substantially rigid frame means is indicated generally at 30. The frame means comprises a frame assembly which consists essentially of a pair of elongated tubular members 31 and 32 which are downwardly concave so as to follow the general troughing contour of the roller assembly. The ends of the tubular members are welded or otherwise suitably secured to short lengths of L-channels or abutment members 33 and 34. These members in turn are welded or otherwise suitably secured to a pair of end plates 35, 36, and 37, 38 disposed in generally parallel relationship to one another and in generally perpendicular relationship to the abutment members. In the figures, the plates have been illustrated in a generally triangular form, but it will be understood that any suitable configuration can be utilized. A lip or outwardly directed flange 39 is formed along the bottom of abutment member 39a for a purpose which will appear hereinafter.

A pair of roller assembly suspending members indicated generally at 40 and 41 suspend the roller assembly from the substantially rigid frame assembly. The suspending members or arms consist of short lengths of steel or bell crank levers whose upper ends are inwardly directed as at 42 and 43 so as to line up with the outer ends of dead shafts 28 and 29, respectively, of the wing rollers. Chain links 44, 45 connect the outer ends of the shafts to the upper inturned ends of the suspending members in substantially the same manner as the intermediate links 25 and 26 connect the intermediate roller 22 to the wing rollers.

The roller assembly supporting members are pivotally connected to the frame assembly by pivot means at each end. In this instance the pivot means includes pivot points, indicated at 46 and 47, which comprise a set of pins passing through aligned apertures in the parallel end plates and the roller assembly suspending member, as illustrated best in FIGURES 2 and 3. Suitable cotter pins (not shown) may be used to prevent unintended axial movement of the pivot pins.

The lower ends of the roller assembly suspending members or arms are welded or otherwise suitably secured to connecting means indicated generally at 50 and 51 which secure the entire troughing idler assembly to the rope side frames 11 and 12. In this instance, the connecting means are rope clamps, but it will be understood that this form of connecting means is not essential, and other equivalent means may be substituted. The troughing idler assembly as secured to the flexible strands thus supports the conveying reach 52 of the belt.

In FIGURE 4, a modification of the invention is illustrated in which the points of connection of the roller assembly suspending members to the supporting rope side frames are upwardly displaced as compared to FIGURE 1, to lie, in effect, between the pivot points and the points of connection of the end portions of the roller assembly to the suspending members. In this instance, the roller assembly suspending member 41 is pivoted at 54 to a pair of pivot plates, only one of which, 55, is shown. As can be readily seen by comparison with FIGURE 1, the points of connection of connecting means 51, and thus strand 12, to the troughing idler assembly lies on the same side of pivot point 54 as does the point of connection of the roller assembly suspending member to the end portion of the roller assembly.

A pair of cross plates 56 and 57 are welded or otherwise suitably secured to the pivot plates. An adjustable eyebolt 58 is threaded through a suitable aperture in inner plate 56 in line with the roller assembly suspending arm 41 to thereby provide a positive stop means for the arm. A second eyebolt 59 is indicated in phantom as threaded through outer plate 57 to regulate the outward swing of arm 41 about pivot point 54.

The use and operation of the invention is as follows:

The frame means 30 which includes the elongated tubular members 31, 32, the cross braces 33, 34, the end plates 35-38, and the upper portions of roller assembly suspending arms 40 and 41, provides means for preventing the rope side frames 11 and 12 from moving inwardly when a load on the conveying reach 52 of the conveyor belt passes over the fully flexible roller assembly 21. Thus, in FIGURE 1, the roller assembly suspending arms 40 and 41 are pivoted about pivots 46, 47 so that as the roller assembly 21 troughs and its end portions move inwardly and downwardly, the upper inner ends 43, 42 of arms 40, 41 will swing about the pivot points 46, 47 in the direction of the upper arrow in FIGURE 1 in a generally vertical plane. At the same time, because the pivot points 46, 47 are located between the connecting points of the end portions of the roller assembly to arms 40, 41, and the connecting points of the arms to the rope clamps 50, 51, the rope side frames will swing outwardly as indicated by the lower arrows in FIGURE 1. Any outward movement of the strands will tend to cause them to swing upwardly slightly and, although the net effect may be that the entire troughing idler assembly sinks downwardly from an unloaded posiiton, the downward sinking is not as great as it would be were no means provided for swinging the strands outwardly.

In FIGURE 4, the connecting point of arm 41 to the strand 12 lies on the same side of pivot 54 as does the connection between the outer end of right wing roller 24 and the upper inner end 43 of arm 41. In this instance, the flexible strand will move inwardly when a load passes over the assembly. Since the strand arm connection lies a lesser radial distance above the pivot 54 than does the roller-arm connection, the inward swing of the strands will be substantially less than the inward swing of the ends of the wing rollers.

In each of FIGURES 1 and 4, inward and outward generally transverse swinging movement of the rope side frames is resisted in the first instance by the tension in the strands. This increasing resistance to movement provides a gradually stiffening limiting means which confines the swing of members 40, 41.

In FIGURE 1, lip 39 of abutment member 39a forms a positive limit means which prevents undue inward swinging of the lower end of arm 41 about pivot 47.

In FIGURE 4, positive limit means have been indicated which prevent flexing of the flexible roller assembly past a given point, which point may be reached before the maximum inward deflecting movement of the strands is reached. Thus, when the roller assembly reaches the dotted line position of FIGURE 4, arm member 41 will strike against adjusting eyebolt 58 and will lie along the phantom line indicated at X. This inward positive limit means prevents dumping of the load should the roller assembly flex too much. A similar eyebolt 59 may be provided to prevent too much outward swing of the roller supporting arm 41.

In all embodiments, the softness of the ride is varied in proportion to the load on the conveyor. Although basically this is a cradled troughing idler assembly, the rollers are fully flexible and thus the troughing contour of the belt will be governed by the flexing action of the rollers. Although a cradled assembly has been illustrated and described, it should be understood that other variations, including forms of semi-cradled idler assemblies as illustrated for example in McCann Patent 2,868,-355 are within the scope of the invention.

It should also be understood that the terms "inwardly" and "outwardly" are used in reference to directions which are generally transverse to the longitudinal axis of the conveyor.

The structure of this invention also eliminates the possibility of the belt knocking the troughing idler assembly out of line. In both FIGURES 1 and 4, the roller assembly suspending arms 40 and 41 lie completely below the plane of the belt, so should the belt detrain so far to one side as to flop over the edge of the wing roller it will not strike the idler assembly connecting means.

It should also be understood that although only a three roller assembly, including a single intermediate roller, has been illustrated and described, a greater or lesser number of rollers may be employed without departing from the spirit of the invention.

The foregoing description is intended to be illustrative only, and not definitive. Accordingly, the scope of the invention should not be limited except by the scope of the following appended claims.

We claim:

1. A flexible belt conveyor troughing idler assembly especially adapted for low clearance operations, said troughing idler assembly including, in combination, a roller assembly having a plurality of belt supporting rollers interconnected for flexing movement with respect to one another in a generally vertical plane, a substantially rigid frame assembly for supporting the roller assembly, said frame assembly including a pair of pivots maintained a fixed distance apart and at least a pir of substantially rigid roller assembly suspending members, one of said roller assembly suspending members being swingable about each pivot and being connected, at its upper end portion, to an adjacent end of the roller assembly to thereby enable the roller assembly to flex inwardly and downwardly under load, and structure for translating flexing movement of the roller assembly, and consequently inward movement of the ends of the roller assembly toward one another, into transverse movement of the rope sideframes of a rope sideframe conveyor, said structure including a connector carried by each roller assembly suspending member located on said roller assembly suspending member at a location remote from the pivot, each connector being constructed and arranged to secure its associated roller assembly suspending member to adjacent rope sideframes so as to enable the rope sideframe to be displaced in a transverse direction as the roller assembly suspending member swings about its pivot.

2. A flexible belt conveyor troughing idler assembly especially adapted for low clearance operations, said troughing idler assembly including, in combination, a roller assembly having a plurality of belt supporting rollers interconnected for flexing movement with respect to one another in a generally vertical plane, an elongated frame assembly supporting the roller assembly, said elongated frame assembly including a roller assembly suspending member at each end thereof, each roller assembly suspending member being swingable about a pivot point on the elongated frame assembly, each roller assembly suspending member being flexibly connected at its upper end to an adjacent end of the roller assembly, said pivot points being maintained a substantially fixed distance apart on the elongated frame assembly, and connectors carried by the roller assembly suspending members for securing the roller assembly supporting members, and thereby the troughing idler assembly, to the rope sideframes of a rope sideframe conveyor, said pivot points being located between, firstly, the points of connection of the ends of the roller assembly to the roller assembly suspending members, and secondly, the connectors, whereby inward movement of the ends of the roller assembly induces an opposite, outward movement of the rope sideframes.

3. A flexible belt conveyor troughing idler assembly especially adapted for low clearance operations, said troughing idler assembly including, in combination, a roller assembly having a plurality of belt supporting rollers interconnected for flexing movement with respect to one another in a generally vertical plane, an elongated frame assembly supporting the roller assembly, said elongated frame assembly including a roller assembly suspending member at each end thereof, each roller assembly suspending member being swingable about a pivot point on the elongated frame assembly, each roller assembly suspending member being flexibly connected at its upper end to an adjacent end of the roller assembly, said pivot points being maintained a substantially fixed distance apart on the elongated frame assembly, and connectors carried by the roller assembly suspending members for securing the idler assembly to the rope sideframes of a rope sideframe conveyor, said connectors being located between, firstly, the points of connection of the ends of the roller assembly suspending members to the roller assembly and, secondly, the pivot points, whereby inward movement of the ends of the roller assembly induces a similar inward movement of the rope sideframes.

References Cited in the file of this patent

UNITED STATES PATENTS

| | | |
|---|---|---|
| 909,833 | Vrooman | Jan. 12, 1909 |
| 1,748,301 | McKinlay | Feb. 25, 1930 |
| 2,820,541 | Barnish et al. | Jan. 21, 1958 |